(12) United States Patent
Giraud

(10) Patent No.: US 7,654,783 B2
(45) Date of Patent: Feb. 2, 2010

(54) FASTENING ELEMENT

(75) Inventor: Sylvain Giraud, Echirolles (FR)

(73) Assignee: A Raymond & Cie., Grenoble (FR)

( * ) Notice: Subject to any disclaimer, the term of this patent is extended or adjusted under 35 U.S.C. 154(b) by 0 days.

(21) Appl. No.: 11/885,494

(22) PCT Filed: Feb. 23, 2006

(86) PCT No.: PCT/EP2006/001634

§ 371 (c)(1),
(2), (4) Date: Jun. 17, 2008

(87) PCT Pub. No.: WO2006/097184

PCT Pub. Date: Sep. 21, 2006

(65) Prior Publication Data

US 2009/0016845 A1    Jan. 15, 2009

(30) Foreign Application Priority Data

Mar. 18, 2005  (DE) .................. 10 2005 012 605

(51) Int. Cl.
F16B 37/02    (2006.01)
(52) U.S. Cl. ........................ 411/174; 411/999
(58) Field of Classification Search ................ 411/174,
411/175, 437, 999, 301
See application file for complete search history.

(56) References Cited

U.S. PATENT DOCUMENTS 1,719,301 A * 7/1929 Metcalf, Jr. ................. 411/378
2,399,958 A * 5/1946 Tinnerman .................. 411/175
3,358,729 A * 12/1967 Munse ........................ 411/175
3,645,311 A * 2/1972 Tinnerman .................. 411/173

(Continued)

FOREIGN PATENT DOCUMENTS

EP    1336763 A2    8/2003

(Continued)

OTHER PUBLICATIONS

International Search Report PCT/EP2006/001634.

Primary Examiner—Flemming Saether
(74) Attorney, Agent, or Firm—Tarolli, Sundheim, Covell & Tummino LLP

(57) ABSTRACT

The invention relates to a fastening element comprising a clip part (4), which has a top plate (10), a base plate (3) and a joining section (9). A cutout (11) is made in the top plate (10), and a cutout (5) is made in the base plate (3), these cutouts facing one another. The fastening element also comprises an elongated shaft part (1), which is formed on the base plate (3), has a smooth-wall shaft cutout (2) that leads into the cutout (5) in the base plate and which provided for receiving a connection part. This connection part is provided with an external thread having a nominal diameter and can be guided through the cutout (11) in the top plate and through the cutout (5) in the base plate (3). The cutout (11) in the top plate has, at least in sections, a diameter that is less than the nominal diameter of the external thread but greater than the inside diameter of the shaft cutout (2). This prevents the component from tipping by establishing a pre-fixing in the area of the cutout (11) in the top plate before the external thread engages with the shaft part (1).

16 Claims, 3 Drawing Sheets

U.S. PATENT DOCUMENTS

| | | | |
|---|---|---|---|
| 3,797,548 A * | 3/1974 | Barnett et al. | 411/167 |
| 3,967,049 A * | 6/1976 | Brandt | 174/53 |
| 4,755,090 A * | 7/1988 | Macfee et al. | 411/82 |
| 4,826,375 A * | 5/1989 | Holton | 411/174 |
| 4,883,397 A * | 11/1989 | Dubost | 411/174 |
| 4,955,772 A | 9/1990 | Reck | |
| 5,707,192 A * | 1/1998 | Vortriede et al. | 411/175 |
| 6,006,414 A | 12/1999 | Corporon et al. | |
| 6,102,639 A * | 8/2000 | DiStasio | 411/299 |
| 6,287,064 B1 * | 9/2001 | Jhumra et al. | 411/175 |
| 6,752,419 B1 * | 6/2004 | Clark et al. | 280/734 |
| 7,210,885 B2 * | 5/2007 | Pinzl | 411/353 |

FOREIGN PATENT DOCUMENTS

| | | |
|---|---|---|
| FR | 1336763 | 9/1963 |
| WO | WO2004083657 A1 | 8/1982 |

* cited by examiner

FASTENING ELEMENT

TECHNICAL FIELD

The invention relates to a clip part for joining first and second components together with a connection part that is provided with an external thread with a nominal diameter.

BACKGROUND

Such a device is known from EP 1 336 763 A2. The previously known device for joining a fastening part to a component has a connection part that is provided with an external thread with a nominal diameter and a fastening element that is equipped with a clip part that has a top plate, a base plate facing the top plate and a joining section that joins the top plate to the base plate at a distance. A cutout is made in the top plate and a cutout is made in the base plate, these cutouts facing one another. In addition, the clip part is designed with an elongated shaft part which is formed on the base plate and which has a smooth-wall shaft cutout that leads into the cutout in the base plate. The outside diameter of the connection part is matched to the inside diameter of the shaft cutout in such a way that the external thread engages with the smooth-wall inside of the shaft cutout of the shaft part by cutting a thread, whereby the cutout in the top plate has a diameter that is greater than the inside diameter of the shaft cutout. As a result, any engagement of the connection part with the top plate is prevented in order to ensure free movement of the top plate, which is curved round in the direction of the base plate.

Known from U.S. Pat. No. 6,006,414 is a fastening element in which, formed in a region of a base plate facing a joining section, is a continuous transverse channel which is open in the direction of the top plate and which forms a stop step.

Known from U.S. Pat. No. 4,955,772 is a fastening element in which the connection part having a screw-in section that has an external thread passes through the cutout in the top plate and the cutout in the base plate with a certain play, and can be screwed into the shaft cutout to fasten the fastening element to a component which is arranged between the top plate and the base plate and which has a through-cutout. The dimensions of the shaft cutout and the nominal diameter of the external thread of the connection part are matched to one another in such a way that with sufficient retention force, it can be screwed in using torque that is set in accordance with the installation situation.

SUMMARY OF THE INVENTION

The invention is based on the problem of suggesting a device of the type described above in which the fastening part can be screwed in with no danger of tipping at the start of engagement of the external thread with the shaft part.

The problem is solved in accordance with the invention with a device of the type mentioned above having the characterizing features previously disclosed.

As a result of the fact that in the device according to the invention the cutout in the top plate has, in sections, a smaller diameter which is between the nominal diameter of the external thread and the inside diameter of the the connection part is screwed into the corresponding edge regions of the cutout in the top plate with less torque than for screwing it into the shaft cutout, a thread is cut before the connection part comes into contact with the shaft cutout. As a result, the connection part is guided in positive fashion, and tipping of the fastening element at the start of the engagement of the connection part with the shaft cutout is reliably prevented.

Other advantageous designs of the invention are the objects of the subclaims.

Additional useful designs and advantages result from the following description of a preferred embodiment of the invention, including references to the single figure of the drawing.

DETAILED DESCRIPTION

Figure 1:
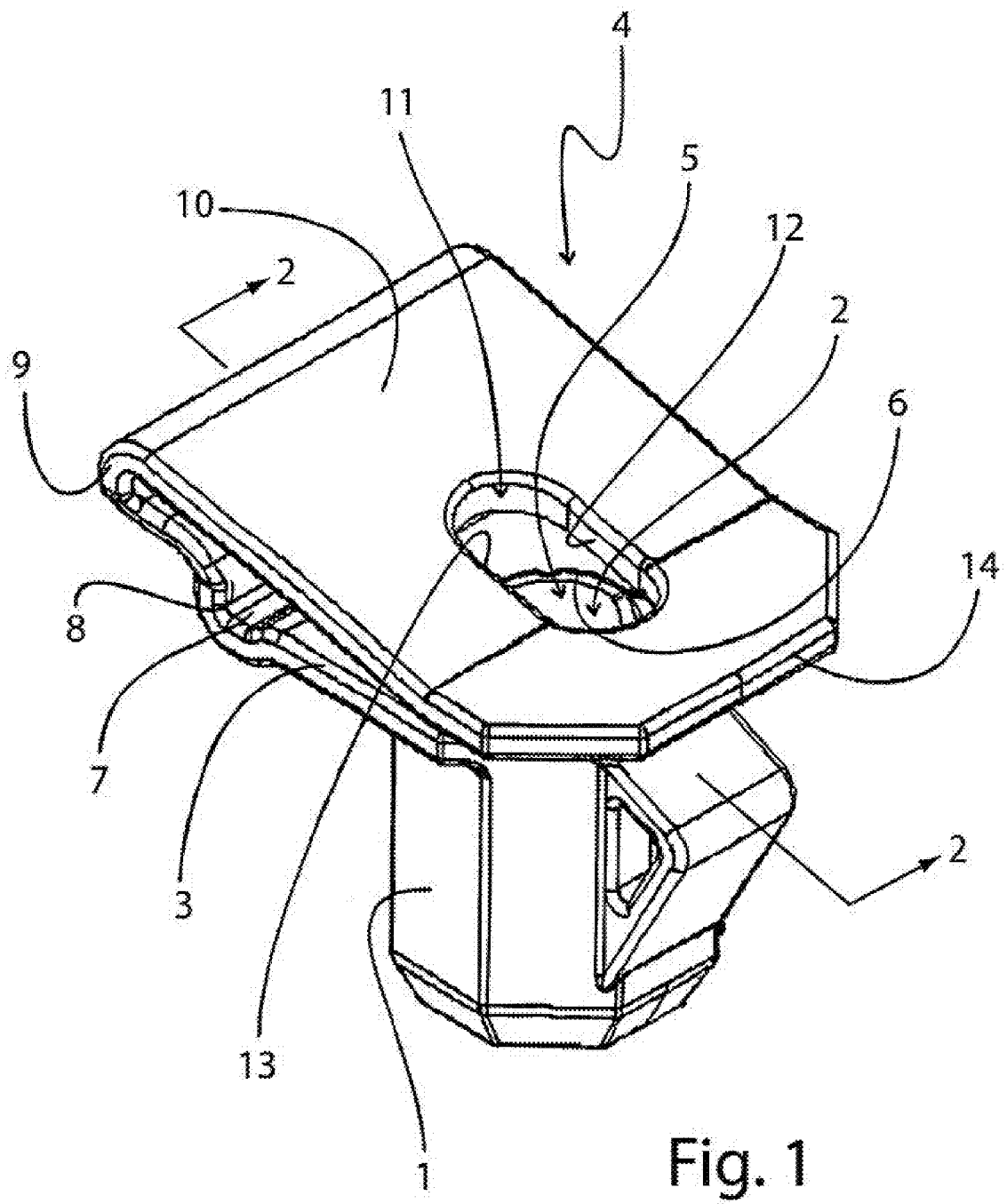
FIG. 1 shows an embodiment of a clip part according to the present invention.

The clip part of the present invention can be attached to a cutout-equipped outer border of a component, not shown in the figure, and which has an elongated shaft part 1. The shaft part 1 preferably provided with a polygonal, e.g., hexagonal, outer wall in order to prevent any turning relative to the component. For this purpose, it is preferable that projections are also provided that engage in complementary indentations formed on the cutout. The shaft part 1 also has a smooth-wall shaft cutout 2 that extends in the longitudinal direction and is preferably a through-cutout.

The shaft part 1 is placed on a base plate 3 of a clip part 4 of the fastening element. The shaft cutout 2 leads into a cutout 5 in the base plate 3, at the outer edge of which is provided a circumferential, raised centering collar 6 that engages into the cutout in the component in order to prevent the component from slipping.

At a distance from the shaft part 1, the base plate 3 has a transverse channel 7, with a stop step 8, which is on the edge side that is away from the shaft part 1 and is oriented at a right angle to the base plate 3, and which extends over a certain height of the base plate 3 on the side opposite the shaft part 1.

The transverse channel 7 and the stop step 8 serve for mounting the fastening part to the outer edge of the component in a twist-proof manner, whereby an edge that possibly protrudes on the outer edge can engage in the transverse channel 7 so that it is assured in this case as well that the base plate 3 lies flat against the component.

Placed on the edge side of the stop step 8 and facing away from the base plate 3 at a right angle and extending first in a direction pointing away from the shaft part 1 and then bent 180 degrees is a joining section 9. Formed in turn on the edge side of the bent end of the joining section 9 is a top plate 10, which extends in the direction of the shaft part 1 and which has a cutout 11 that faces the shaft cutout 2 and the cutout 5 in the base plate. In the illustrated embodiment, the cutout 11 in the top plate is shaped as an oblong hole with two flat sections 12, 13 that are parallel and that face one another.

Provided on the edge side of the top plate 10 facing the joining section 9 is an angled tongue 14 that points away from the base plate 3, whereby the cutout 11 on the top plate extends into the edge region of the tongue 14. The tongue 14 serves to guide the fastening element when it is slipped onto the component, until its edge side lies against the stop step 8 and a possibly present edge engages into transverse channel 7, which is open in the direction of the top plate 10.

Figure 2:
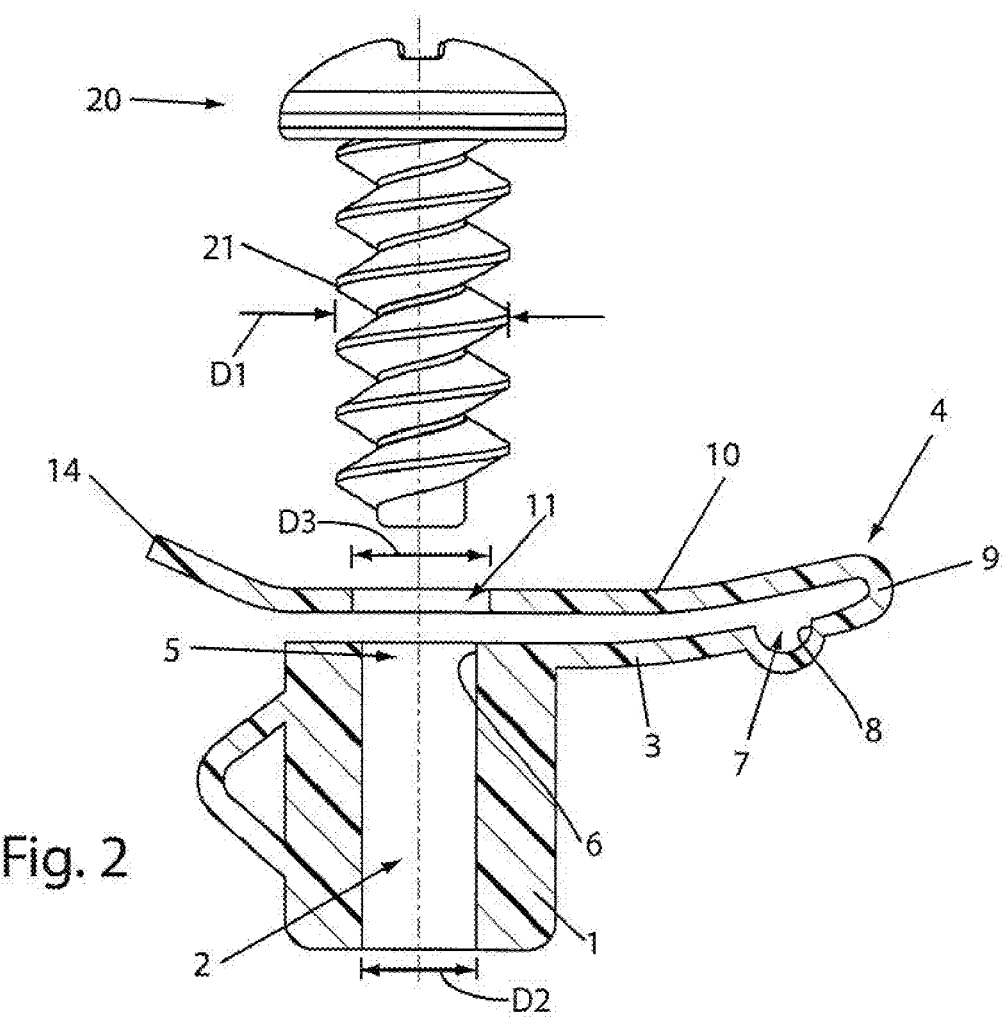
FIG. 2 shows a section view of the clip part taken alone line 2-2 of FIG. 1.
Figure 3:
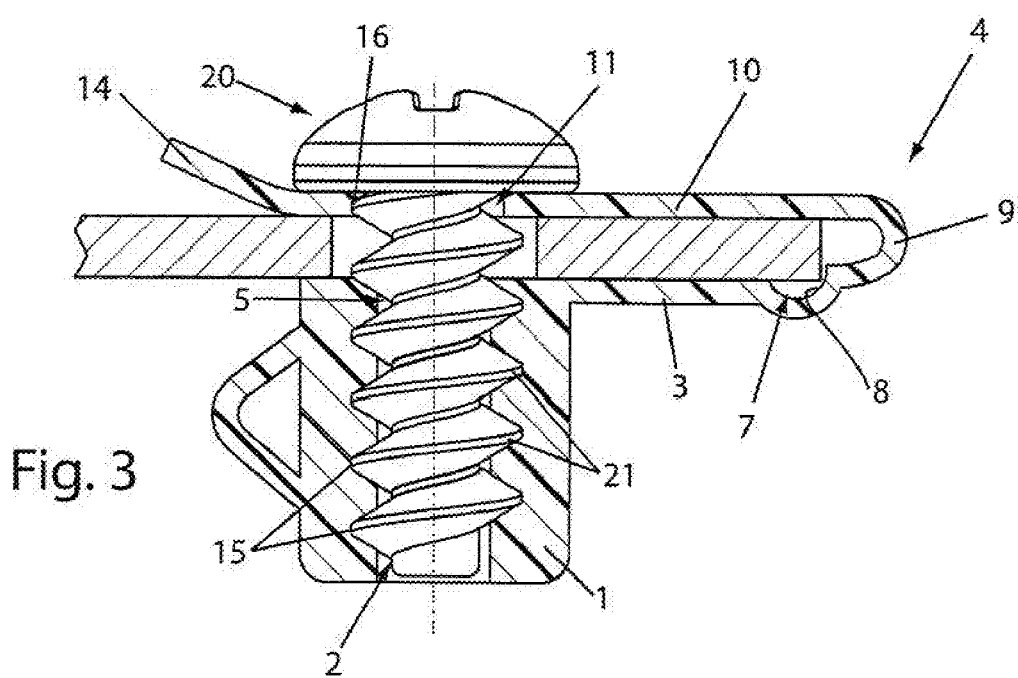
FIG. 3 shows an enlarged view of the clip part of FIG. 2 with a connection part threaded into the top plate and the base plate.
Figure 4:
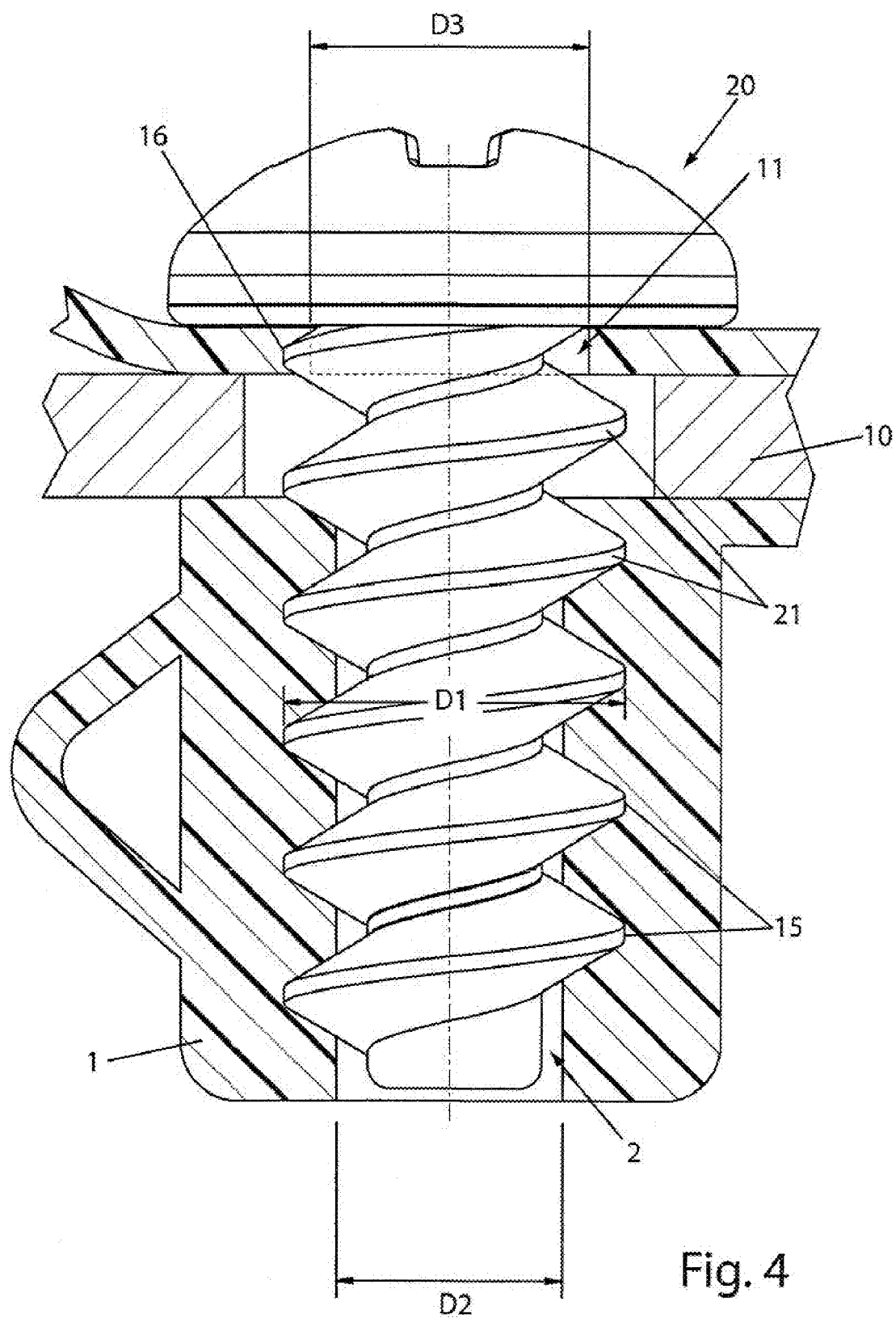
FIG. 4 shows an enlarged view of the clip part of FIG. 3.

A connection part 20, shown in FIGS. 2-4, that has an external thread 21 with a nominal diameter D1 can be screwed in the direction of the top plate 10 into the inventive fastening element that is mounted on the component. The nominal diameter D1 of the connection part 20 is matched to the inside diameter D2 of the shaft cutout 2 in such a way that the external thread 21 engages with the smooth-wall inside of the shaft cutout 2 of the shaft part 1 by cutting a thread 16.

The distance between the flat sections 12, 13 of the cutout in the top plate 10 is set in such a way that in order to prevent torques that are too high, it is only slightly smaller that the nominal diameter D1 of the external thread 21. As a result, the external thread 21 first cuts its way through cutout 11 in the top plate before it reaches through the cutout of the component and the cutout 5 in the base plate 3 and engages with the shaft cutout 2. A guiding and pre-fixing of the connection part 20 has thus already been achieved at the start of the engagement with the shaft cutout 2, which effectively prevents an unintentional tipping of the fastening element according to the invention.

The invention claimed is:

1. A clip part (4) for joining together first and second components with a connection part (20) that is provided with an external thread (21) with a nominal diameter (D1), the clip part (4) comprising:
   a top plate (10),
   a base plate (3) that faces the top plate (10), and
   a joining section (9) that joins the top plate (10) with the base plate (3) at a distance, whereby a cutout (11) is made in the top plate (10) and a cutout (5) is made in the base plate (3), these cutouts facing one another, and with an elongated shaft part (1), which is formed on the base plate (3) and which has a smooth-wall shaft cutout (2) which leads into the cutout (5) in the base plate,
   whereby the nominal diameter (D1) of the connection part (20) is matched to the inside diameter (D2) of the shaft cutout (2) in such a way that the external thread (21) engages with the smooth-wall inside of the shaft cutout (2) of the shaft part (1) by cutting a thread (15), whereby the cutout (11) in the top plate has a dimension (D3) that is greater than the inside diameter (D2) of the shaft cutout (2),
   wherein the cutout (11) in the top plate has, at least in sections, a dimension (D3) that is smaller than the nominal diameter (D1) of the external thread (21) of the connection part (20) such that the cutout (11) has a smooth surface before the external thread (21) of the connection part (20) has engaged the cutout (11) and a threaded surface (16) after the external thread (21) has engaged the cutout (11).

2. The clip part (4) according to claim 1, characterized in that the cutout (11) in the top plate is an oblong hole.

3. The clip part (4) according to claim 2, characterized in that the cutout (11) in the top plate has two flat sections (12, 13) that are parallel and that face one another, and the distance between them is smaller than the nominal diameter of the external thread and greater than the nominal diameter of the shaft cutout (2).

4. The clip part (4) according to claim 3 characterized in that formed on the top plate (10) is a tongue (14) that is aligned pointing outward from the base plate (3).

5. The clip part (4) according to claim 4, characterized in that the cutout (11) in the top plate extends into the region of the tongue (14).

6. The clip part (4) according to claim 3, characterized in that formed in the region of the base plate (3) is a transverse channel (7) that is open in the direction of the top plate (10).

7. The clip part (4) according to claim 2 characterized in that formed on the top plate (10) is a tongue (14) that is aligned pointing outward from the base plate (3).

8. The clip part (4) according to claim 7, characterized in that the cutout (11) in the top plate extends into the region of the tongue (14).

9. The clip part (4) according to claim 2, characterized in that formed in the region of the base plate (3) is a transverse channel (7) that is open in the direction of the top plate (10).

10. The clip part (4) according to claim 9, characterized in that the stop step (8) is placed on the edge side of the transverse channel (7) facing away from the shaft part (1).

11. The clip part (4) according to, claim 1 characterized in that formed on the top plate (10) is a tongue (14) that is aligned pointing outward from the base plate (3).

12. The clip part (4) according to claim 11, characterized in that the cutout (11) in the top plate extends into the region of the tongue (14).

13. The clip part (4) according to claim 1, characterized in that formed in the region of the base plate (3) is a transverse channel (7) that is open in the direction of the top plate (10).

14. The clip part (4) according to claim 1, characterized in that formed in the region of the base plate (3) is a stop step (8) that is raised relative to the base plate (3).

15. The clip part (4) according to claim 14, characterized in that the stop step (8) is placed on the edge side of the transverse channel (7) facing away from the shaft part (1).

16. The clip part (4) according to claim 1, characterized in that formed in the region of the base plate (3) is a stop step (8) that is raised relative to the base plate (3).

* * * * *